No. 618,663. Patented Jan. 31, 1899.
L. B. HALE.
DISH WASHER.
(Application filed Nov. 21, 1898.)
(No Model.)
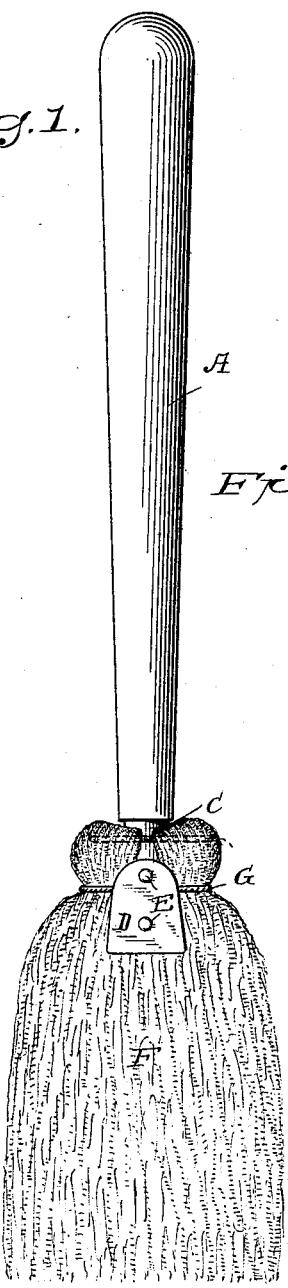
Fig. 1.
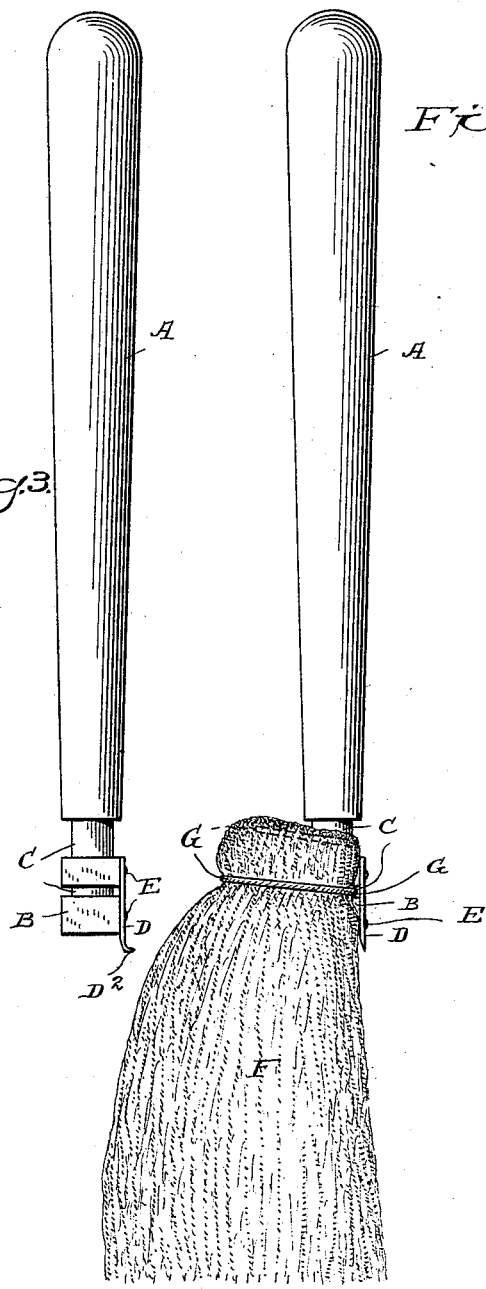
Fig. 2.
Fig. 3.
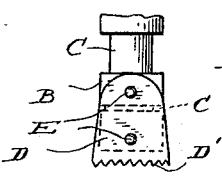
Fig. 4.
WITNESSES
H. A. Lamb
S. V. Haley
INVENTOR
Lovett B. Hale
By H. M. Wooster
Atty.

UNITED STATES PATENT OFFICE.

LOVETT B. HALE, OF BRIDGEPORT, CONNECTICUT, ASSIGNOR OF ONE-HALF TO HERMAN E. HUBBARD, OF MERIDEN, CONNECTICUT.

DISH-WASHER.

SPECIFICATION forming part of Letters Patent No. 618,663, dated January 31, 1899.

Application filed November 21, 1898. Serial No. 696,957. (No model.)

*To all whom it may concern:*

Be it known that I, LOVETT B. HALE, a citizen of the United States, residing at Bridgeport, county of Fairfield, State of Connecticut, have invented a new and useful Dish-Washer, of which the following is a specification.

My invention has for its object to provide a hand kitchen utensil adapted for use in washing all kinds of culinary vessels and dishes.

In order to overcome the difficulties heretofore found by housewives and provide a simple and inexpensive hand utensil or implement which will wash perfectly all sizes and styles of dishes and will also scrape and wash all sizes and styles of culinary vessels—such as pots, kettles, and skillets—I have devised the novel kitchen utensil or dish-washer of which the following description, in connection with the accompanying drawings, is a specification, letters of reference being used to designate the several parts.

Figure 1 is an elevation of my novel dishwasher; Fig. 2, an elevation from a point of view at right angles to the point of view in Fig. 1; Fig. 3, an elevation of the handle detached, showing a slightly-modified form of scraper; and Fig. 4 is a detail view of the lower end of the handle, showing another slight modification in the operative edge of the scraper.

A denotes the handle, which I have shown as provided at its lower end with angular portions B and with grooves C.

D denotes a scraper which is rigidly secured to the lower end of the handle in any suitable manner, as by rivets E, the angular portions B of the handle forming when used solid abutments, to which the scraper may be attached. It should be understood, however, that neither the angular portions nor the grooves are essential features of construction.

F denotes the washer proper, which consists of a mass of yarn or soft cord, preferably cotton, which is attached to the handle in any suitable manner, as by cords or wires G. It will of course be understood that the special manner in which the washer—*i. e.*, the mass of yarn or cord—is attached to the handle is not of the essence of my invention. An essential feature, however, of my invention is that one side of the lower end of the handle be left clear, so as to permit the scraper to be rigidly attached to the handle. In other words, as will be understood from Fig. 2 in connection with Fig. 1, the washer proper—*i. e.*, the yarn or cord—extends outward from the handle on three sides only, there being no yarn or cord on one side of the handle, so as to permit the scraper to be readily attached and to leave the scraper clear for use. In the present instance I have shown the washer—*i. e.*, the yarn or cord—as attached to the handle by laying one end of the mass of strands near the lower end of the handle, the strands lying parallel with the handle, and attaching them to the handle by means of a wire or cord G, which appears in dotted lines only in Figs. 1 and 2, this special wire or cord engaging the upper groove C. The mass of yarn or cord is then turned backward and downward, so as to hang over the lower end of the handle, to which it is shown as secured by a second cord or wire G, which shows in full lines in Figs. 1 and 2, and which engages the lower groove C, so that it is rendered practically impossible for the yarn or cord to become detached from the handle or to slip in use. In practice the yarn or cord may be attached to the handle before the scraper is attached, the latter being placed over the lower cord or wire G, as clearly shown in Fig. 2.

In Fig. 3 I have shown a slight modification in the form of the scraper, which is therein shown as provided with a flange $D^2$, and in Fig. 4 a form of scraper in which the edge is serrated or toothed, as at D'.

Having thus described my invention, I claim—

1. An implement of the character described comprising a handle, a mass of yarn attached thereto and extending on three sides thereof and a scraper rigidly attached to the fourth side of the handle and unencumbered by the yarn, substantially as described for the purpose specified.

2. An implement of the character described comprising a handle, having at its lower end angular portions and grooves, a mass of yarn attached to the lower end thereof by means of cord engaging the grooves and a scraper rigidly secured to the angular portions.

In testimony whereof I affix my signature in presence of two witnesses.

LOVETT B. HALE.

Witnesses:
A. M. WOOSTER,
S. V. HELEY.